(12) United States Patent
Player et al.

(10) Patent No.: US 6,993,700 B1
(45) Date of Patent: Jan. 31, 2006

(54) SYSTEM AND METHOD FOR GENERATING FORWARD ERROR CORRECTION BASED ALARMS

(75) Inventors: Andrew Mark Player, Salem, NH (US); George Beshara Bendak, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 498 days.

(21) Appl. No.: 10/037,959

(22) Filed: Dec. 21, 2001

Related U.S. Application Data

(60) Provisional application No. 60/257,862, filed on Dec. 22, 2000.

(51) Int. Cl.
*H03M 13/00* (2006.01)
*G06F 11/00* (2006.01)

(52) U.S. Cl. ..................... 714/758; 714/704
(58) Field of Classification Search ........ 714/704–706, 714/758, 749
See application file for complete search history.

(56) References Cited

U.S. PATENT DOCUMENTS

| | | | |
|---|---|---|---|
| 5,515,362 A * | 5/1996 | Iwase | 370/228 |
| 5,724,362 A * | 3/1998 | Lau | 714/704 |
| 6,452,906 B1 * | 9/2002 | Afferton et al. | 370/242 |
| 6,487,686 B1 * | 11/2002 | Yamazaki et al. | 714/703 |
| 6,690,884 B1 * | 2/2004 | Kelty et al. | 398/27 |
| 6,801,720 B1 * | 10/2004 | Mizuochi et al. | 398/30 |

* cited by examiner

*Primary Examiner*—Albert Decady
*Assistant Examiner*—Esaw Abraham
(74) *Attorney, Agent, or Firm*—Law Office of Gerald Maliszewski; Gerald Maliszewski

(57) ABSTRACT

A system and method are provided for generating alarms from forward error correction (FEC) data in a G.709 network-connected integrated circuit. The method includes: receiving messages including forward error correction bytes; using the forward error correction bytes to detect errors in the messages; and, generating alarm signals in response to the detected errors. Generating alarm signals in response to the detected errors includes generating a signal degrade (SD) signal in response to detecting a first number of errors (error density) within a predetermined time period. Likewise, generating alarm signals in response to the detected errors includes generating a signal fail (SF) signal in response to detecting a second number of errors (second error density), greater than the first number, within the predetermined time period. The method further includes: selecting an error type. Then, alarm signals are generated in response to the selected error type. The error types include a "1s" density alarm, a "0s" density alarm, a bytes density alarm, and a sub-row density alarm.

20 Claims, 4 Drawing Sheets

Fig. 2a OTUk ROW (SHOWN BEFORE INTERLEAVED TRANSMISSION)

Fig. 2b OTUk ROW (SHOWN AFTER INTERLEAVED TRANSMISSION)

| COLUMN | | | | | |
|---|---|---|---|---|---|
| ROW | 1 ooo 16 17 | ooo | 3824 | 3825 ooo | 4080 |
| | OH | PAYLOAD | | FEC PARITY | |

Fig. 2c

| COLUMN | | | | |
|---|---|---|---|---|
| | 1 ooo | 14 15 16 17 | | |
| 1 | OTUk OVERHEAD | OPUk OVERHEAD | | |
| R 2 | ODUk OVERHEAD | | | |
| O 3 | ODUk OVERHEAD | OPUk PAYLOAD (4x 3808 bytes) | | 3824 |
| W 4 | ODUk OVERHEAD | | | |

COLUMN #

| ROW # | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | FRAME ALIGNMENT BYTES | | | | | | MFAS | SM | | | GCC0 | | RES | | OPUk OVERHEAD | |
| 2 | RES | | | TCM ACT | TCM6 | | TCM5 | | TCM4 | | | FTFL | | | | |
| 3 | TCM3 | | | TCM2 | | TCM1 | | | | PM | | EXP | | OPUk OVERHEAD | | |
| 4 | GCC1 | | GCC2 | | APS/PCC | | | | | RES | | | | | | |

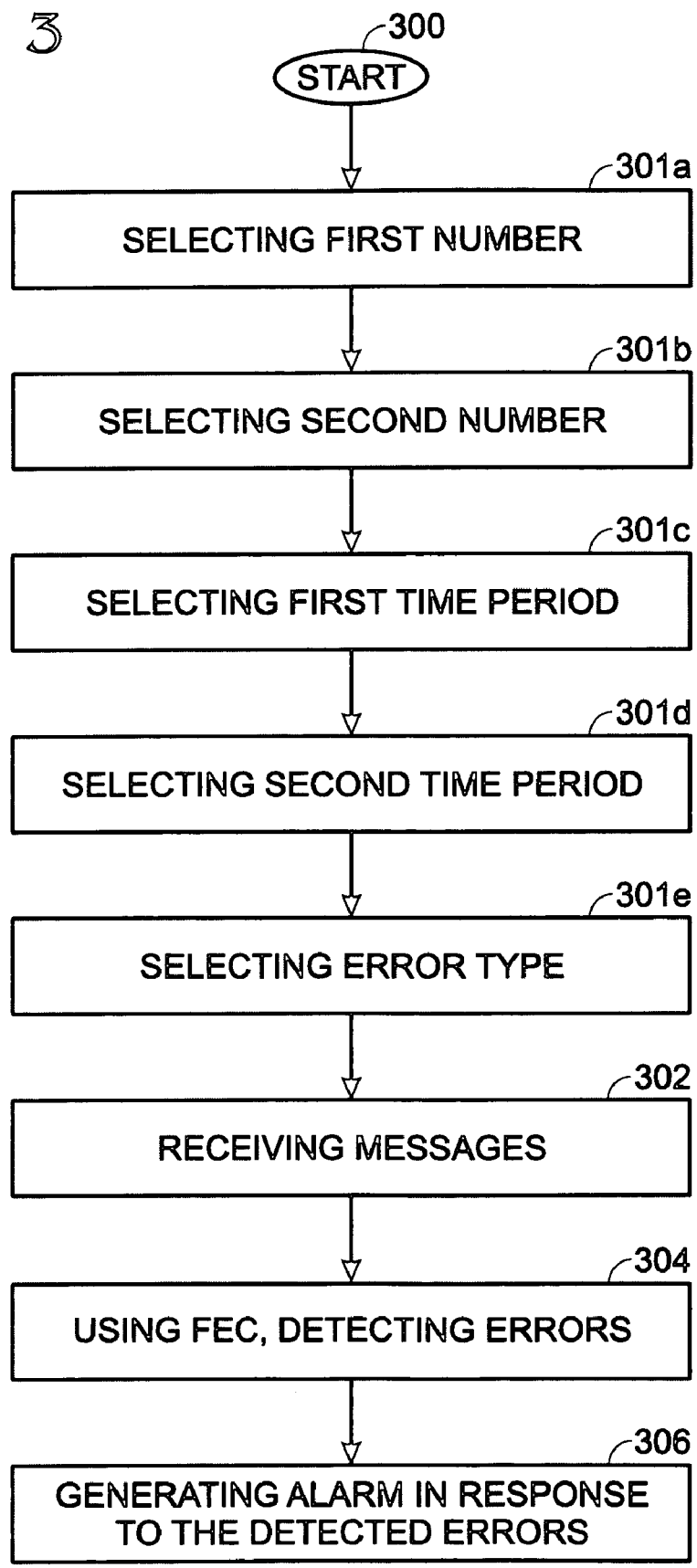

SYSTEM AND METHOD FOR GENERATING FORWARD ERROR CORRECTION BASED ALARMS

This application claims the benefit of 60/257,862 filed on Dec. 22, 2000.

BACKGROUND OF THE INVENTION

1. Field of the Invention

This invention generally relates to digital wrapper format communications and, more particularly, to a system and method for generating useful error alarms for digital wrapper communications using forward error correction statistics.

2. Description of the Related Art

Digital signals are typically processed as a serial data stream and recovered using amplitude and timing parameters. Alternately stated, the amplitude of the digital signal must be monitored to detect the difference between a "1" bit and a "0" bit. In addition, a clock must be generated to differentiate bit positions. In transmission, a signal can undergo several stages of amplification, attenuation, and limiting. Further, the transmission medium may act to degrade the signal. To recover the signal at a receiver, the signal voltage swing is analyzed around a threshold voltage. Signals above the threshold can be considered a "1" bit, while signals below the threshold can be considered a "0" bit. If the threshold is set correctly, no bits are misinterpreted in the threshold analysis. However, if the threshold is set incorrectly, then errors will result as the signal is converted into digital information. Errors can be introduced by a variety of other means, besides thresholding. For example, the errors can be random in nature, or occur as the result of a faulty amplifier or leveler circuit. The errors can be introduced by the transmitter, the receiver, or can be introduced in the transmission media.

Some forms of digital communications include forward error correction (FEC) information included as overhead. Using the FEC information, degraded or misinterpreted bits can be recovered. Networks that are built to be compliant to the International Telecommunications Union ITU-T G.709 (G.709) specification have the requirement of monitoring the quality of the data received at each node in the network. For this reason, G.709 defines a byte in the overhead field for monitoring the bit error density, called Bit Interleaved Parity (BIP). The BIP byte in each frame is then collected over time to generate the signal fail (SF) and signal degrade (SD) alarms. The bit parity is calculated for each bit position of the byte. Thus, there are eight parity checks. The parity is calculated by adding all the bits from a particular bit position in every byte for an entire frame.

However, in G.709, the received BIP byte is calculated after errors have been corrected with the FEC. In order for the BIP in any individual frame to reflect any errors at all, the error density in one or more sub-rows of the frame must be higher than 8 bytes out of 255. This is because the standard FEC algorithm used in G.709 networks is the Reed-Solomon (255,239) algorithm which has the ability to correct all errors in a 255 byte codeword, if there are no more than 8 bytes out of each 255 bytes received in error. Thus, the Reed-Solomon (255,239) algorithm used in G.709 systems will correct up to 8 byte errors in each 255-byte block.

If more than 8 bytes in each 255-byte block are in error, the Reed-Solomon (255,239) algorithm is no longer able to correct the errors. At this error rate, the BIP itself is not of much use because it has a high probability of being incorrect. Additionally, an error rate of more than 8 bytes out of 255 bytes corresponds to an error rate of greater than $3*10^{-2}$, which is typically much higher than can be tolerated in the networks that are built to be compliant to G.709. Thus, using the BIP method for generating SD and SF means that neither the SD nor the SF will get set until the error density is much higher than can be tolerated in the network.

At a BER of $10^{-12}$, a fairly typical error rate, the FEC corrects all the errors, and the BIP indicates no errors. However, as the number of errors approach the point at which the FEC can no longer correct all the errors, the BIP will have long since been useless as an indicator of error information.

Many carriers or network service providers like to specify their system's performance with a guaranteed BER for a particular bandwidth (data rate). If fact, services are often sold using such specifications. This information cannot be provided from the BIP-8 bytes. Typically, received frames must be parallel processed with additional equipment to determine BER data.

It would be advantageous if there were a more accurate method of generating SD and SF alarms in a G.709 compliant system.

It would be advantageous if error information could be generated in response to the FEC information, instead of BIP.

SUMMARY OF THE INVENTION

The objective of the present invention is to define a method for generating Signal Fail (SF) and Signal Degrade (SD) alarms based on Forward Error Correction (FEC) statistics in an integrated circuit that is compliant to the International Telecommunications Union ITU-T G.709 (G.709) specification. This method is different, and much more useful than the BIP method of generating SD and SF alarms. This method is to use the statistics from the FEC calculations to determine when to set the SD and SF alarms. Using FEC statistics, SD and SF alarms can be triggered using a variety of criterion including, but not limited to:

Corrected 1s density;

Corrected 0s density;

Corrected Bytes density; and,

Uncorrectable Sub-row density.

Using Signal Degrade and Signal Fail alarms based on FEC statistics allows a network designer to decide when the network is approaching an unacceptable error density at error densities that are much smaller than can be achieved by using BIP to generate these alarms.

Accordingly, a method is provided for generating alarms from FEC data in a G.709 network-connected integrated circuit. The method comprises: receiving messages including forward error correction bytes; using the forward error correction bytes to detect errors in the messages; and, generating an alarm signal in response to the detected errors. Generating an alarm signal in response to the detected errors includes generating a signal degrade (SD) signal in response to detecting a first number of errors, within a predetermined time period (first error density). Likewise, generating an alarm signal in response to the detected errors includes generating a signal fail (SF) signal in response to detecting a second number of errors, greater than the first number, within the predetermined time period (second error density).

The method further comprises: selecting an error type. Then, alarm signals are generated in response to the selected error type. The error types include a "1s" density alarm, a "0s" density alarm, a bytes density alarm, and a sub-row density alarm.

Additional details of the above-described method, and a system for generating alarms from FEC data in a G.709 network-connected integrated circuit is provided below.

BRIEF DESCRIPTION OF THE DRAWINGS

FIGS. 2a through 2d are diagrams illustrating the G.709 optical channel transport unit (OTU) frame structure.

FIG. 3 is a flowchart illustrating the present invention method for generating alarms from forward error correction (FEC) data in a G.709 network-connected integrated circuit.

DETAILED DESCRIPTION OF THE PREFERRED EMBODIMENTS

Figure 1:
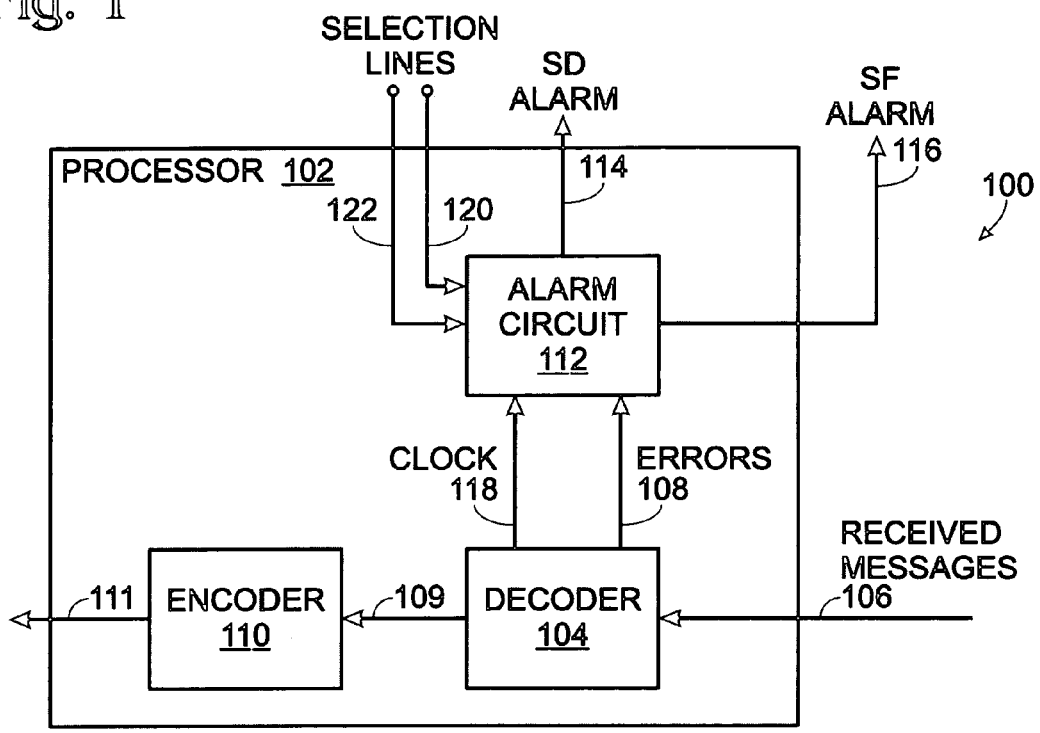
FIG. 1 is a schematic block diagram illustrating the present invention system for generating alarms from forward error correction (FEC) data in a G.709 network-connected integrated circuit.
Figure 1:
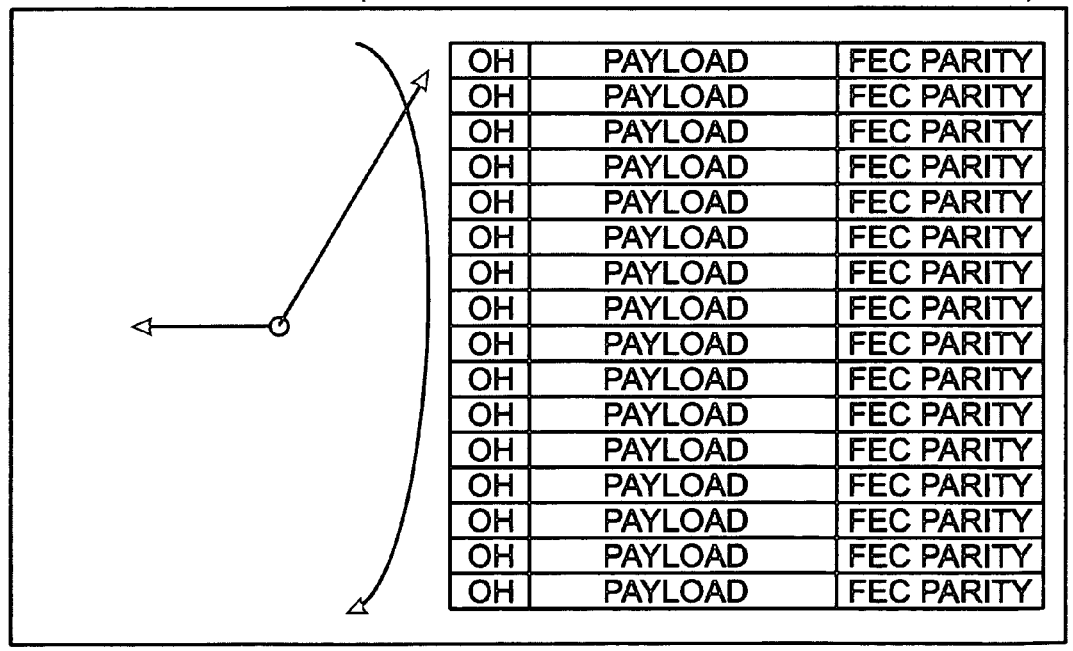
Figure 2D:
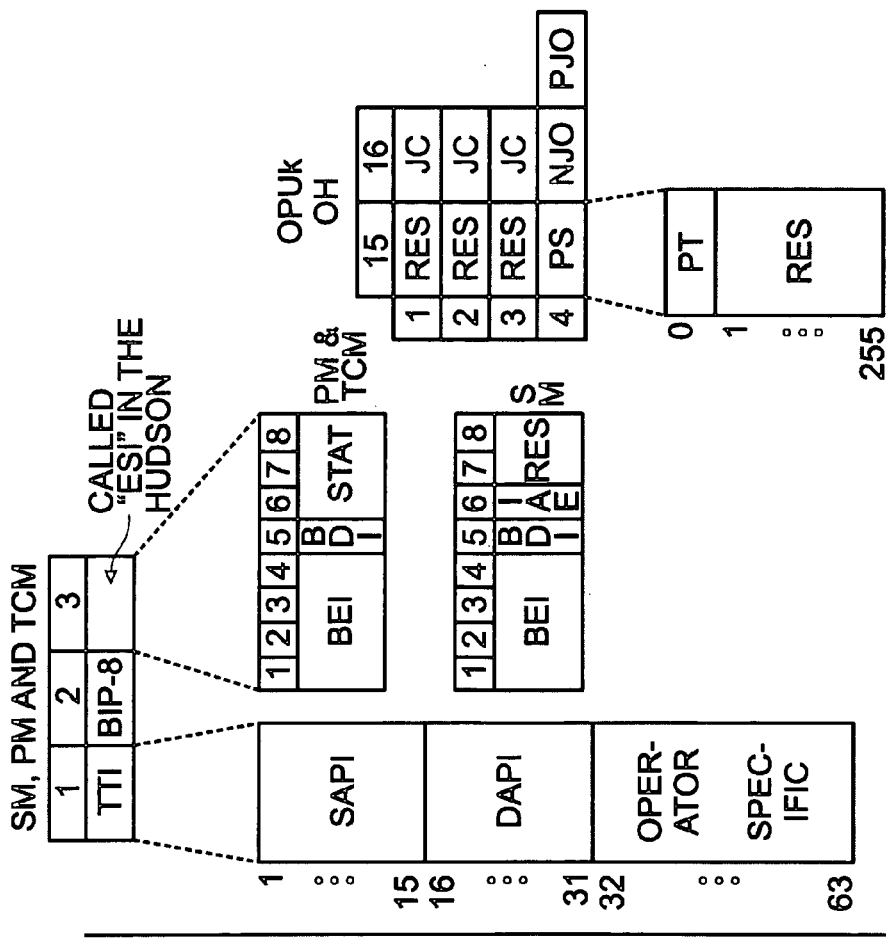

FIG. 1 is a schematic block diagram illustrating the present invention system 100 for generating alarms from forward error correction (FEC) data in a G.709 network-connected integrated circuit 102. The system 100 of the IC, or processor 102 comprises a forward error correction decoder 104 having an input on line 106 to receive messages including forward error correction bytes. The forward error correction decoder 104 has an output on line 108 to supply the number of detected errors in the messages. Although not directly related to the present invention alarm generation system 100, the decoded message can be supplied on line 109, and FEC coded again by an encoder 110, before the message is retransmitted on line 111. Sections of the received message overhead section may be replaced or modified before the message is encoded.

FIGS. 2a through 2d are diagrams illustrating the G.709 optical channel transport unit (OTU) frame structure.

Returning to FIG. 1, an alarm circuit 112 has an input on line 108 to accept the number of detected errors. The alarm circuit 112 has outputs on lines 114 and 116 to supply alarm signals in response to the detected errors on line 108. That is, the forward error correction decoder 104 detects a first number of errors, and the alarm circuit 112 generates a signal degrade (SD) signal on line 114 in response to the first number of errors. Likewise, when the forward error correction decoder 104 detects a second number of errors, greater than the first number, the alarm circuit 112 generates a signal fail (SF) signal on line 116 in response to the second number of errors.

The decoder 104 has an output on line 118 to supply a clock signal derived from the rate at which the messages are received. That is, the clock rate is related to the number of frames or rows received per second. The alarm circuit 112 has an input on line 118 to accept the clock signal. Using the clock signal, the alarm circuit 112 generates a signal degrade (SD) signal in response to the first number of errors being detected within a first time period of the clock signal. Alternately, the first number of errors detected within a first time period can be considered a first error density. Likewise, the alarm circuit 112 generates a signal fail (SF) signal in response to the second number of errors being detected within a second time period of the clock signal. Again, the second number of errors detected within the second time period can be considered to be a second error density. The first and second time periods are the same in some aspects of the invention. Alternately, the time periods may be different, but the first and second number of errors are scaled proportionally to the ratio of the time periods. The alarm circuit 112 has an input on line 120 to select the first number, the second number, the first time period, and the second time period. Typically (as shown), the clock signal on line 118 is derived in response to the rate at which the decoder 104 receives frames on line 106. Alternately (but not shown), the clock could be supplied from an external source.

The forward error correction decoder 104 detects a plurality of error types. The alarm circuit 112 has an input on line 122 for selecting error type, and generates alarm signals on lines 114 and 116 in response to the selected error type. For example, the alarm circuit 112 accepts a "1s" density type error selection on line 122 and generates alarms on lines 114 and 116 in response to the number of 1-bit errors detected by the FEC decoder 104. Measurements can be made of the number of 1-bit errors in a frame, a series of frames, or in a particular bit position, to name but a few. This type of error analysis may be useful in detecting a receiver thresholding error in the decoder 104. Likewise, the alarm circuit 112 can accept a "0s" density error type selection and generates an alarm in response to the number of 0-bit errors detected. The decoder 104 receives messages in a non-return to zero (NRZ) protocol where decisions must be made as the whether a signal represents a "1" bit or a "0" bit. Improper adjustment of the threshold, or the "1"/"0" decision point can lead to a disproportionate number of errors for one of the polarities.

The alarm circuit 112 also accepts a bytes density error type selection on line 122 and generates alarms on lines 114 and 116 in response to the number of byte errors detected. For this error type, the number of bytes are counted that have one or more detected bit errors. Thus, the number of byte errors does not necessarily equal the number of bit errors, as a byte can have more than one bit error. Regardless of the number of bit errors in a byte, the maximum number of byte errors per byte is one. The RS(255,239) algorithm works on byte symbols, correcting up to 8 bytes in error out of a group of 255 bytes, regardless of the number of bit errors in each byte.

Further, the alarm circuit 112 accepts a sub-row density error type selection on line 122 and generates alarms on lines 114 and 16 in response to the number of sub-row errors detected. In the G.709 standard, each row is composed of sixteen sub-rows. Each sub-row includes 239 bytes of overhead (OH) and payload, plus an additional 16 bytes for FEC (see FIG. 2a). The sub-row error count is a count of the sub-rows that could not be corrected using the RS(255,239) algorithm, due to the occurrence of more than 8 bytes errors out of the 255 bytes in the sub-row.

The alarm signal on lines 114 and 116 can be a simple digital value, for example, a "0" for no alarm and a "1" to indicate the SD or SF condition. Alternately, the alarm can be expressed as a BER, the number of counted errors (depending on the selected error type), or other more quantifiable representation of the signal condition.

FIG. 3 is a flowchart illustrating the present invention method for generating alarms from forward error correction (FEC) data in a G.709 network-connected integrated circuit. Although the method is depicted as a sequence of number steps for clarity, no order should be inferred from the numbering unless explicitly stated. The method begins at Step 300. Step 302 receives messages including forward error correction bytes. Step 304 uses the forward error correction bytes to detect errors in the messages. Step 306 generates alarm signals in response to the detected errors.

In some aspects, the method comprises further steps. Step 301a selects a first number. Step 301b selects a second number. Using the forward error correction bytes to detect errors in the messages in Step 304 includes detecting a first number of errors. Then, generating alarm signals in response to the detected errors in Step 306 includes generating a signal degrade (SD) signal in response to the first number of errors. Likewise, using the forward error correction bytes to detect errors in the messages in Step 304 includes detecting a second number of errors, greater than the first number, and generating alarm signals in response to the detected errors in Step 306 includes generating a signal fail (SF) signal in response to the second number of errors.

In some aspects, a further step, Step 301c selects the first time period. Step 301d selects the second time period. Then, generating an alarm signal in response to the detected errors in Step 306 includes generating a signal degrade (SD) signal in response to the first number of errors being detected within a first time period. Alternately stated, the SD signal is generated in response to a first error density. Likewise, generating an alarm signal in response to the detected errors includes generating a signal fail (SF) signal in response to the second number of errors being detected within a second time period. Alternately stated, the SF signal is generated in response to a second error density. The errors can be accumulated and measured over the course of a first and second number of received frames or rows, as opposed to a first and second time period or absolute period of time.

Step 301e selects an error type. Then, generating an alarm signal in response to the detected errors in Step 306 includes generating alarm signals in response to the selected error type. In some aspects of the method, a "1s" density alarm error type is selected in Step 301e, and generating alarm signals in response to the detected errors in Step 306 includes generating an alarm in response to the number of 1-bit errors detected.

In some aspects, selecting an error type in Step 301e includes selecting a "0s" density alarm. Then, generating alarm signals in response to the detected errors in Step 306 includes generating an alarm in response to the number of 0-bit errors detected. When a bytes density alarm is selected in Step 301e, Step 306 generates an alarm in response to the number of byte density errors detected. When a sub-row density alarm is selected in Step 301e, Step 306 generates an alarm in response to the number of sub-row errors detected.

A system and method have been provided for generating alarms from forward error correction (FEC) data in a G.709 network-connected integrated circuit. A few examples have been given for how the FEC data is used, however, the use of FEC data to indicate the health of network communications has additional, and broader applications. Other variations and embodiments of the invention will occur to those skilled in the art.

We claim:

1. In a G.709 network-connected integrated circuit, a method for generating alarms from forward error correction (FEC) data, the method comprising:
   receiving messages including forward error correction bytes;
   using the forward error correction bytes to detect errors in the messages;
   generating alarm signals in response to the detected errors;
   wherein using the forward error correction bytes to detect errors in the messages includes detecting a first number of errors; and,
   wherein generating alarm signals in response to the detected errors includes generating a signal degrade (SD) signal in response to the first number of errors.

2. The method of claim 1 wherein using the forward error correction bytes to detect errors in the messages includes detecting a second number of errors, greater than the first number; and,
   wherein generating alarm signals in response to the detected errors includes generating a signal fail (SF) signal in response to the second number of errors.

3. The method of claim 2 wherein generating an alarm signal in response to the detected errors includes generating a signal degrade (SD) signal in response to the first number of errors being detected within a first time period.

4. The method of claim 3 wherein generating alarm signals in response to the detected errors includes generating a signal fail (SF) signal in response to the second number of errors being detected within a second time period.

5. The method of claim 4 further comprising:
   selecting the first number;
   selecting the second number;
   selecting the first time period; and
   selecting the second time period.

6. The method of claim 5 further comprising:
   selecting an error type; and,
   wherein generating alarm signals in response to the detected errors includes generating an alarm signal in response to the selected error type.

7. The method of claim 6 wherein selecting an error type includes selecting a "1s" density alarm; and,
   wherein generating alarm signals in response to the detected errors includes generating an alarm in response to the number of 1-bit errors detected.

8. The method of claim 6 wherein selecting an error type includes selecting a "0s" density alarm; and,
   wherein generating alarm signals in response to the detected errors includes generating an alarm in response to the number of 0-bit errors detected.

9. The method of claim 6 wherein selecting an error type includes selecting a bytes density alarm; and,
   wherein generating alarm signals in response to the detected errors includes generating an alarm in response to the number of byte errors detected.

10. The method of claim 6 wherein selecting an error type includes selecting a sub-row density alarm; and,
    wherein generating an alarm signal in response to the detected errors includes generating an alarm in response to the number of sub-row errors detected.

11. In a G.709 network-connected integrated circuit, a system for generating alarms from forward error correction (FEC) data, the system comprising:
    a forward error correction decoder having an input to receive messages including forward error correction bytes, the forward error correction decoder having an output to supply the number of detected errors in the messages;
    an alarm circuit having an input to accept the number of detected errors and an output to supply alarm signals in response to the detected errors;
    wherein the forward error correction decoder detects a first number of errors; and,
    wherein the alarm circuit generates a signal degrade (SD) signal in response to the first number of errors.

12. The system of claim 11 wherein the forward error correction decoder detects a second number of errors, greater than the first number; and, wherein the alarm circuit generates a signal fail (SF) signal in response to the second number of errors.

13. The system of claim 12 wherein the decoder has an output to supply a clock signal derived from the rate at which the messages are received; and, wherein the alarm circuit has a input to accept the clock signal, and wherein the alarm circuit generates a signal degrade (SD) signal in response to the first number of errors being detected within a first time period of the clock signal.

14. The system of claim 13 wherein the alarm circuit generates a signal fail (SF) signal in response to the second number of errors being detected within a second time period of the clock signal.

15. The system of claim 14 wherein the alarm circuit has an input to select the first number, the second number, the first time period, and the second time period.

16. The system of claim 15 wherein the forward error correction decoder detects a plurality of error types; and, wherein the alarm circuit has an input for selecting error type, and wherein the alarm circuit generates an alarm signal in response to the selected error type.

17. The system of claim 16 wherein the alarm circuit accepts a 1s density type error selection and generates an alarm in response to the number of 1-bit errors detected.

18. The system of claim 16 wherein the alarm circuit accepts a 0s density error type selection and generates an alarm in response to the number of 0-bit errors detected.

19. The system of claim 16 wherein the alarm circuit accepts a bytes density error type selection and generates an alarm in response to the number of byte errors detected.

20. The system of claim 16 wherein the alarm circuit accepts a sub-row density error type selection and generates an alarm in response to the number of sub-row errors detected.

\* \* \* \* \*